US012397561B2

(12) United States Patent
Hosaka

(10) Patent No.: US 12,397,561 B2

(45) Date of Patent: Aug. 26, 2025

(54) IMAGE FORMING APPARATUS, IMAGE FORMING SYSTEM, IMAGE FORMING METHOD, AND NON-TRANSITORY RECORDING MEDIUM

(71) Applicant: Shigetoshi Hosaka, Kanagawa (JP)

(72) Inventor: Shigetoshi Hosaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 180 days.

(21) Appl. No.: 18/462,029

(22) Filed: Sep. 6, 2023

(65) Prior Publication Data

US 2024/0149592 A1 May 9, 2024

(30) Foreign Application Priority Data

Nov. 7, 2022 (JP) ................................ 2022-178077

(51) Int. Cl.
*B41J 2/21* (2006.01)
*B41J 2/045* (2006.01)

(52) U.S. Cl.
CPC ......... *B41J 2/2139* (2013.01); *B41J 2/04505* (2013.01); *B41J 2/2142* (2013.01)

(58) Field of Classification Search
CPC ..... B41J 2/2139; B41J 2/04505; B41J 2/2142
See application file for complete search history.

(56) References Cited

U.S. PATENT DOCUMENTS 10,464,353 B2 11/2019 Nakamura et al.
2008/0266345 A1* 10/2008 Onodera ................ B41J 2/2139 347/14
2015/0254536 A1 9/2015 Hosaka
2016/0026904 A1 1/2016 Hosaka
2016/0236462 A1 8/2016 Hosaka
2017/0210144 A1 7/2017 Hosaka
(Continued)

FOREIGN PATENT DOCUMENTS

JP 2004-276394 A 10/2004
JP 2020-069670 A 5/2020
(Continued)

OTHER PUBLICATIONS

Extended European Search Report dated Mar. 6, 2024 issued in corresponding European Appln. No. 23207024.3.

*Primary Examiner* — Jason S Uhlenhake
(74) *Attorney, Agent, or Firm* — Harness, Dickey & Pierce, P.L.C.

(57) ABSTRACT

An image forming apparatus includes carriages each carrying a liquid discharge head and circuitry. The circuitry acquires divided print data having a size extended in a direction corresponding to a conveyance direction of a recording medium from a size corresponding to a length of a nozzle array of the liquid discharge head in the conveyance direction; identifies, for the liquid discharge head of a particular carriage, from the divided print data, a shifted data portion having a size corresponding to the length of the nozzle array and being shifted by a number of pixels corresponding to an amount of deviation from a target installation position of the particular carriage in the conveyance direction; controls the liquid discharge head to discharge ink to the recording medium using the shifted data portion; and controls the particular carriage to move in a main scanning direction based on the shifted data portion.

8 Claims, 6 Drawing Sheets

(56) References Cited

U.S. PATENT DOCUMENTS

| | | | | |
|---|---|---|---|---|
| 2022/0297443 | A1 | 9/2022 | Hosaka | |
| 2023/0089133 | A1* | 3/2023 | Yamazaki | B41J 2/36 347/195 |
| 2023/0226815 | A1 | 7/2023 | Hosaka | |

FOREIGN PATENT DOCUMENTS

| | | | |
|---|---|---|---|
| JP | 2022-043669 | A | 3/2022 |
| JP | 2023-103809 | A | 7/2023 |

* cited by examiner

IMAGE FORMING APPARATUS, IMAGE FORMING SYSTEM, IMAGE FORMING METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2022-178077, filed on Nov. 7, 2022, in the Japan Patent Office, the entire disclosure of which is hereby incorporated by reference herein.

BACKGROUND

Technical Field

Embodiments of the present disclosure relate to an image forming apparatus, an image forming system, an image forming method, and a non-transitory recording medium.

Related Art

An image printed by an inkjet printer which is an image forming apparatus is formed by a large number of ink dots arranged in an array, discharged from a nozzle array. The position where an ink dot is formed (i.e., dot formation position), which is the position where the ink lands on a printing medium, may deviate from the target position. In such a case, an image printed on the recording medium such as a paper sheet is not clear. In particular, some inkjet printers include a plurality of carriages arranged in a sub-scanning direction, and each of the carriages carries one or more liquid discharge heads. In such an inkjet printer, if the carriages are not accurately positioned at the respective designed positions, the dot formation positions are misaligned among the carriages. As a result, an image printed by these carriages is not clear. Accordingly, the carriages are positioned at the designed positions in the inkjet printer with delicate adjustment. For example, the use of a jig can keep variations in positioning accuracy within a certain range but cannot reduce the positioning variations to zero.

A method known in the art for adjusting the dot formation positions in the sub-scanning direction in inkjet printers is adjusting the conveyance distance of the recording medium. However, in an inkjet printer that performs printing with a plurality of carriages arranged side by side in the sub-scanning direction, the method of adjusting the conveyance distance of the recording medium is not effective. Since a conveyance mechanism to convey a recording medium is common among the carriages, the adjustment result is reflected in the dot formation positions of ink discharged from all the carriages. For this reason, the dot formation positions of ink discharged from a carriage that does not require adjustment are adversely affected, and the landing positions of ink deviate. In this case, the dot formation positions cannot be adjusted by adjusting the conveyance distance of the recording medium.

SUMMARY

According to an embodiment, an image forming apparatus includes a plurality of carriages each of which carries a liquid discharge head; and circuitry. The circuitry acquires divided print data divided from print data. The divided print data has an extended size extended in a direction corresponding to a conveyance direction of a recording medium from a size corresponding to a length of a nozzle array of the liquid discharge head in the conveyance direction. The circuitry identifies, for the liquid discharge head of a particular carriage of the plurality of carriages, a shifted data portion from the divided print data. The shifted data portion has a size corresponding to the length of the nozzle array and is shifted by a number of pixels corresponding to an amount of deviation from a target installation position of the particular carriage in the conveyance direction. The circuitry control the liquid discharge head to discharge ink to the recording medium using the shifted data portions, and controls the particular carriage to move in a main scanning direction based on the shifted data portion.

According to another embodiment, an image forming system includes the image forming apparatus described above and another circuitry configured to divide, from the print data, the divided print data.

Another embodiment provides a method for forming an image by an image forming apparatus including a plurality of carriages each of which carries a liquid discharge head. The method includes acquiring divided print data divided from print data. The divided print data has an extended size extended in a direction corresponding to a conveyance direction of a recording medium from a size corresponding to a length of a nozzle array of the liquid discharge head in the conveyance direction. The method further includes identifying, for the liquid discharge head of a particular carriage of the plurality of carriages, from the divided print data, a shifted data portion having a size corresponding to the length of the nozzle array, shifted by a number of pixels corresponding to an amount of deviation from a target installation position of the particular carriage in the conveyance direction; controlling the liquid discharge head to discharge ink to the recording medium using the shifted data portion; and controlling the particular carriage to move in a main scanning direction based on the shifted data portion, the main scanning direction being perpendicular to the conveyance direction.

Another embodiment provides a non-transitory recording medium storing a plurality of program codes which, when executed by one or more processors, causes the processors to perform the method described above.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
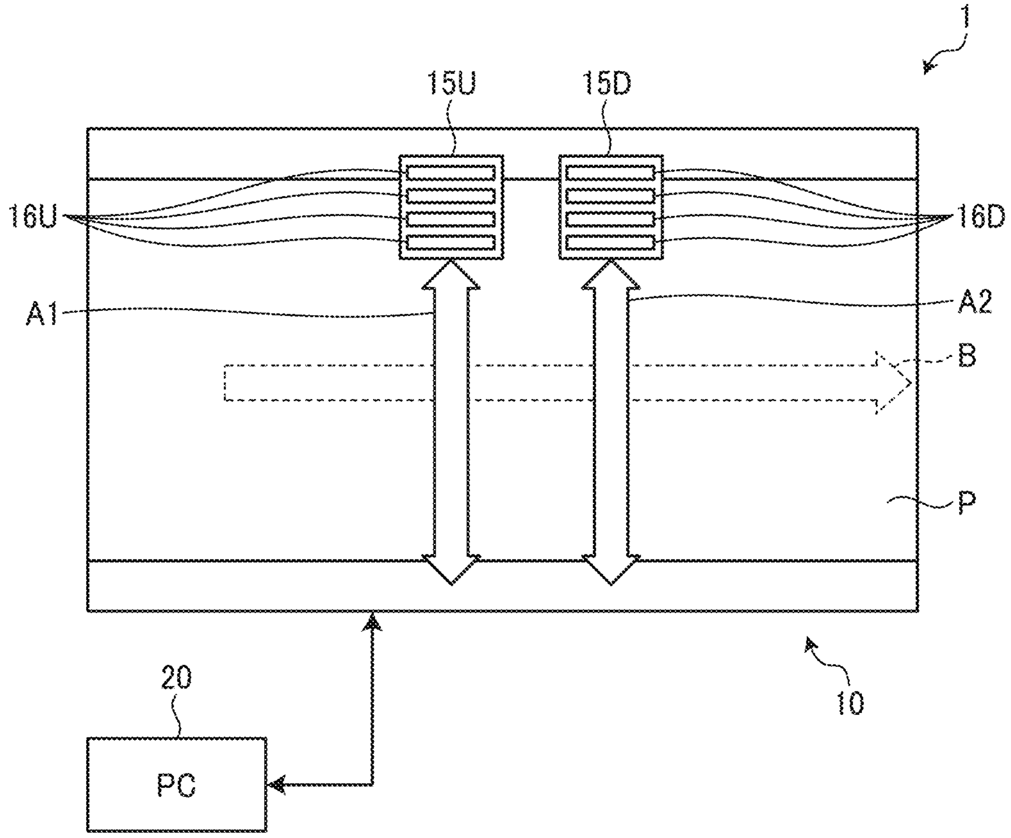
FIG. 1 is a schematic diagram illustrating a configuration of an image forming apparatus of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, descriptions are given in detail below of an image forming apparatus, an image forming system, an image forming method, and a program for causing a computer system to perform the image forming method according to embodiments of the present disclosure with reference to the drawings. As used herein, the singular forms "a," "an," and "the" are intended to include the plural forms as well, unless the context clearly indicates otherwise.

The present invention, however, is not limited to the following embodiments, and constituent elements of the following embodiments include elements easily conceivable by those skilled in the art, substantially the same elements, and elements within so-called equivalent ranges. Further, various omissions, substitutions, changes, and combinations of the constituent elements may be made without departing from the gist of the following embodiments.

Terms used in this disclosure are defined as described below. "Computer software," which may be referred to simply as "software" in the following description, is defined as a program related to operation of a computer or any information that is used in processing performed by a computer and equivalent to a program. "Application software," which may be referred to simply as an "application," is a generic name for any software used to perform certain processing. By contrast, an "operating system (OS)" is software for controlling a computer to allow, for example, application software to use computer resources. An "OS" controls basic operations of the computer, such as input and output of data, management of hardware resources such as a memory and a hard disk, and processes to be performed.

"Application software" operates by utilizing functions provided by an OS. A "program" is a set of instructions for causing a computer to perform processing to generate a certain result. Information that is not a direct command to a computer is not referred to as a program itself. However, information that defines processing performed by a program is similar in nature to a program and thus is interpreted as equivalent to a program. For example, a data structure, which is a logical structure of data represented by an interrelation between data elements, is interpreted as equivalent to a program.

Schematic Configuration of Image Forming System

FIG. 1 is a schematic diagram illustrating a configuration of an image forming apparatus of an image forming system according to the present embodiment. A description is given of a schematic configuration of an image forming system 1 according to the present embodiment with reference to FIG. 1.

As illustrated in FIG. 1, the image forming system 1 includes an image forming apparatus 10 and a personal computer (PC) 20.

The image forming apparatus 10 is a serial image forming apparatus that includes a plurality of carriages. The mage forming apparatus 10 discharges ink from liquid discharge heads carried by the carriages, so as to form an image on a recording medium such as a paper sheet. As illustrated in FIG. 1, the image forming apparatus 10 includes carriages 15U and 15D.

The carriage 15U reciprocates in a main scanning direction indicated by arrow A1 in FIG. 1, perpendicular to a sub-scanning direction indicated by arrow B in FIG. 1, in which a recording medium P is conveyed. By so doing, the carriage 15U changes the landing positions of ink discharged from a liquid discharge head 16U mounted on the carriage 15U. The carriage 15U carries one or more liquid discharge heads 16U. The carriage 15U is disposed upstream from the carriage 15D in the sub-scanning direction.

As will be described later, the liquid discharge head 16U includes a nozzle array including a plurality of nozzles for discharging ink, arranged in the sub-scanning direction.

The carriage 15D reciprocates in the main scanning direction, indicated by arrow A2 in FIG. 1, perpendicular to the sub-scanning direction, indicated by arrow B in FIG. 1, in which the recording medium P is conveyed. By so doing, the carriage 15D changes the landing positions of ink discharged from a liquid discharge head 16D mounted on the carriage 15D. The carriage 15D carries one or more liquid discharge heads 16D. The carriage 15D is disposed downstream from the carriage 15U in the sub-scanning direction.

The liquid discharge head 16U of the carriage 15U and the liquid discharge head 16D of the carriage 15D may discharge different inks from each other. For example, the liquid discharge head 16U may form an image with color inks such as cyan (C), magenta (M), yellow (Y), and black (K) inks, and the liquid discharge head 16D may form an image with a spot color ink such as a white ink, a metallic color ink, or a fluorescent color ink. Alternatively, one of the liquid discharge head 16U and the liquid discharge head 16D may discharge one or more achromatic inks and the other may discharge one or more chromatic inks.

Although the image forming system 1 illustrated in FIG. 1 includes two carriages, i.e., the carriage 15U and the carriage 15D, the number of the carriages is not limited thereto, and the image forming system 1 may include three or more carriages.

The PC 20 is an information processing apparatus that transmits, to the image forming apparatus 10, print data to be subjected to printing. In the present embodiment, the PC 20 divides the print data into pieces of data corresponding to the liquid discharge head 16U of the carriage 15U and the liquid discharge head 16D of the carriage 15D, respectively, and transmits the divided pieces of data to the image forming apparatus 10. In this disclosure, the data obtained by dividing the print data by the image forming apparatus 10 may be referred to as "divided print data."

The information processing apparatus that transmits print data to the image forming apparatus 10 is not limited to the PC 20 but may be, for example, a smartphone, a tablet communication terminal, or a workstation.

Hardware Configuration of Image Forming Apparatus

Figure 2:
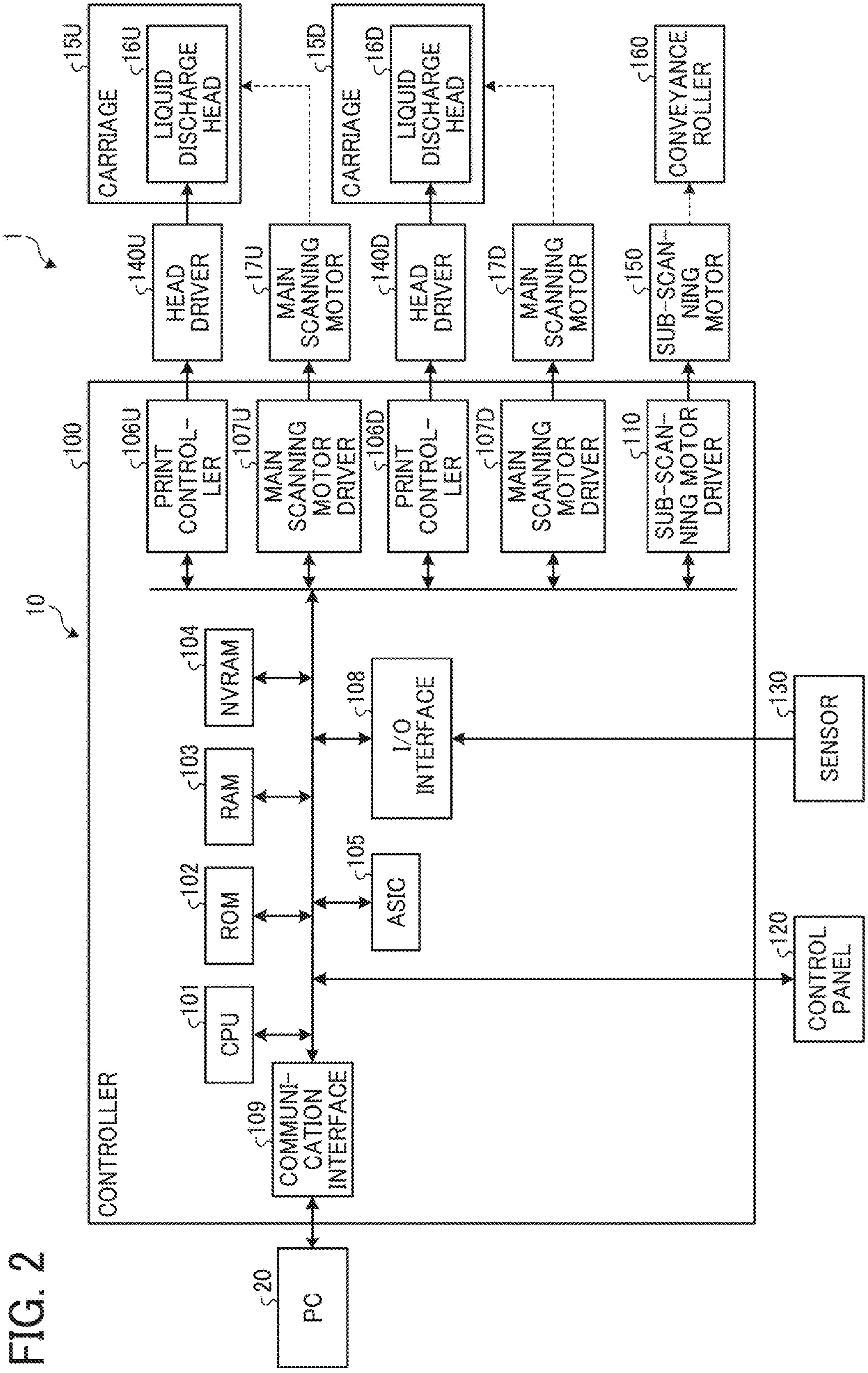
FIG. 2 is a block diagram illustrating a hardware configuration of an image forming apparatus according to an embodiment of the present disclosure.

FIG. 2 is a block diagram illustrating a hardware configuration of the image forming apparatus according to the present embodiment. A description is given of a hardware configuration of the image forming apparatus 10 according to the present embodiment with reference to FIG. 2.

As illustrated in FIG. 2, the image forming apparatus 10 includes a controller 100, a control panel 120, a sensor 130, head drivers 140U and 140D, main scanning motors 17U and 17D, a sub-scanning motor 150, and a conveyance roller 160.

The controller 100 includes a central processing unit (CPU) 101, a read only memory (ROM) 102, a random access memory (RAM) 103, a non-volatile RAM (NVRAM) 104, an application specific integrated circuit (ASIC) 105, print controllers 106U and 106D, main scanning motor drivers 107U and 107D, an input and output (I/O) interface 108, a communication interface 109, and a sub-scanning motor driver 110.

The CPU 101 is a processor that controls the entire operation of the image forming apparatus 10. The ROM 102 is a non-volatile storage device that stores fixed data such as programs to be executed by the CPU 101. The RAM 103 is a volatile storage device that serves as a work area for processing executed by the CPU 101. Further, the RAM 103 temporarily stores data such as image data.

The NVRAM 104 is a non-volatile storage device that retains data and programs even when the power supply of the image forming apparatus 10 is off.

The ASIC 105 is an integrated circuit that executes various kinds of signal processing on image data, image processing such as rearrangement, and processing on other input and output signals for controlling the entire operation of the image forming apparatus 10.

The print controller 106U is a control circuit that controls the discharge operation of the liquid discharge head 16U via the head driver 140U under the control of the CPU 101. The print controller 106U transfers data for driving the liquid discharge head 16U to the head driver 140U. For example, the print controller 106U transfers image data as serial data to the head driver 140U. Further, the print controller 106U outputs, for example, a transfer clock, a latch signal, and a control signal used for transferring the image data to the head driver 140U. The head driver 140U selectively applies, based on the serially-input image data corresponding to one line of print data to be printed by the liquid discharge head 16U, driving pulses to pressure generators of the liquid discharge head 16U. The driving pulses represent a drive waveform received from the print controller 106U. In so doing, the head driver 140U drives the liquid discharge head 16U to discharge ink. The image data is based on the divided print data divided by the PC 20 described above, and will be described in detail later.

The print controller 106D is a control circuit that controls the discharge operation of the liquid discharge head 16D via the head driver 140D under the control of the CPU 101. The print controller 106D transfers data for driving the liquid discharge head 16D to the head driver 140D. For example, the print controller 106D transfers image data as serial data to the head driver 140D. Further, the print controller 106U outputs, for example, a transfer clock, a latch signal, and a control signal used for transferring the image data, to the head driver 140D. The head driver 140D selectively applies, based on the serially-input image data corresponding to one line of print data to be printed by the liquid discharge head 16D, driving pulses to pressure generators of the liquid discharge head 16D. The driving pulses represent a drive waveform received from the print controller 106D. In so doing, the head driver 140U drives the liquid discharge head 16D to discharge ink. The image data is based on the divided print data divided by the PC 20 described above, and will be described in detail later.

The main scanning motor driver 107U is a driving circuit that controls the operation of the main scanning motor 17U under the control of the CPU 101. The main scanning motor 17U moves the carriage 15U in the main scanning direction under the control of the main scanning motor driver 107U.

The main scanning motor driver 107D is a driving circuit that controls the operation of the main scanning motor 17D under the control of the CPU 101. The main scanning motor 17D moves the carriage 15D in the main scanning direction under the control of the main scanning motor driver 107D.

The I/O interface 108 is an interface circuit used to obtain the data from the sensor 130 and extract the data used to control elements and units of the image forming apparatus 10. The sensor 130 is, for example, an optical sensor that reads a printed image on the recording medium P or a temperature sensor that detects the temperature of a heater in printing.

The communication interface 109 is an interface circuit that transmits and receives data and signals to and from the PC 20. Specifically, the communication interface 109 transmits and receives data and signals to and from the PC 20 via a cable or a network. In a configuration where the communication interface 109 communicates with the PC 20 via a network, the communication interface 109 complies with, for example, Transmission Control Protocol (TCP)/Internet Protocol (IP).

The print data (divided print data) stored in a reception buffer of the communication interface 109 is analyzed by the CPU 101 and subjected to processing (e.g., image processing and data rearrangement) executed by the ASIC 105. The processed pieces of data are transferred, as discharge data, to the head driver 140U and the head driver 140D by the print controller 106U and the print controller 106D, respectively.

The sub-scanning motor driver 110 is a driving circuit that controls the operation of the sub-scanning motor 150 under the control of the CPU 101. The sub-scanning motor 150 rotates the conveyance roller 160 under the control of the sub-scanning motor driver 110 so as to convey the recording medium P in the sub-scanning direction. The conveyance roller 160 rotates, driven by the sub-scanning motor 150, and conveys the recording medium P in the sub-scanning direction along a conveyance passage.

The control panel 120 is a device such as a touch panel for inputting and outputting various kinds of information.

The hardware configuration of the image forming apparatus 10 is not limited to that illustrated in FIG. 2. The image forming apparatus 10 does not necessarily include all the components illustrated in FIG. 2 or may include some other components.

Hardware Configuration of PC

Figure 3:
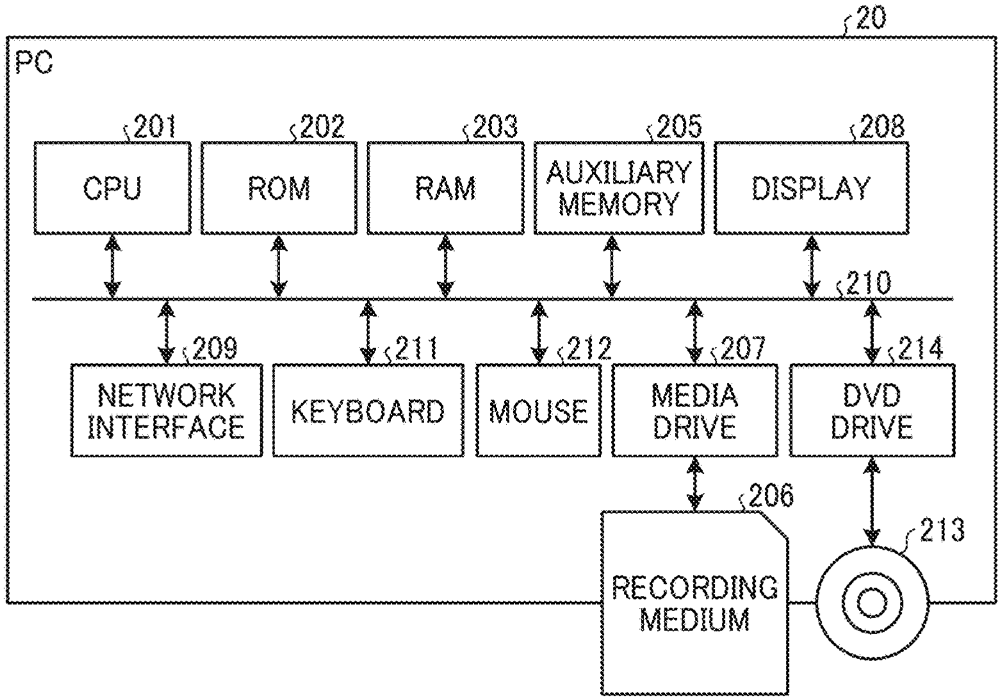
FIG. 3 is a block diagram illustrating a hardware configuration of a personal computer (PC) according to an embodiment of the present disclosure.

FIG. 3 is a block diagram illustrating a hardware configuration of the PC according to the present embodiment. A description is given below of the hardware configuration of the PC 20 according to the present embodiment with reference to FIG. 3.

As illustrated in FIG. 3, the PC 20 includes a CPU 201, a ROM 202, a RAM 203, an auxiliary memory 205, a media drive 207, a display 208, a network interface 209, a keyboard 211, a mouse 212, and a digital versatile disc (DVD) drive 214.

The CPU 201 is a processor that controls the entire operation of the PC 20. The ROM 202 is a non-volatile storage device that stores programs to be executed by the PC 20. The RAM 203 is a volatile storage device that serves as a work area for the CPU 201.

The auxiliary memory 205 is a storage device such as a hard disk drive (HDD) or a solid state drive (SSD) that stores various kinds of data including print data and programs.

The media drive 207 controls reading and writing of data to and from a recording medium 206 such as a flash memory under the control of the CPU 201.

The display 208 is a display device that includes, for example, a liquid crystal display or an organic electroluminescence (EL) display on which various kinds of information such as a cursor, a menu, a window, characters, and images are displayed.

The network interface 209 is an interface for data communication with the image forming apparatus 10 via a network. The network interface 209 is, for example, a network interface card (NIC) that supports ETHERNET and establishes communications in compliance with TCP/IP.

The keyboard 211 is an input device used for selecting characters, numbers, or various instructions, and for moving a cursor, for example. The mouse 212 is an input device for selecting and executing various instructions, selecting an object to be processed, and moving a cursor, for example.

The DVD drive 214 controls reading and writing of various kinds of data from and to a DVD 213 that is a removable storage medium. The DVD 213 is, for example, a DVD-ROM or a DVD-recordable (DVD-R).

The CPU 201, the ROM 202, the RAM 203, the auxiliary memory 205, the media drive 207, the display 208, the network interface 209, the keyboard 211, the mouse 212, and the DVD drive 214 are connected to one another to communicate with each other, via a bus line 210 such as an address bus or a data bus.

The hardware configuration of the PC 20 is not limited to that illustrated in FIG. 3. The PC 20 does not necessarily include all the components illustrated in FIG. 3 or may include other components.

Functional Configuration and Operation of Image Forming System

Figure 4:
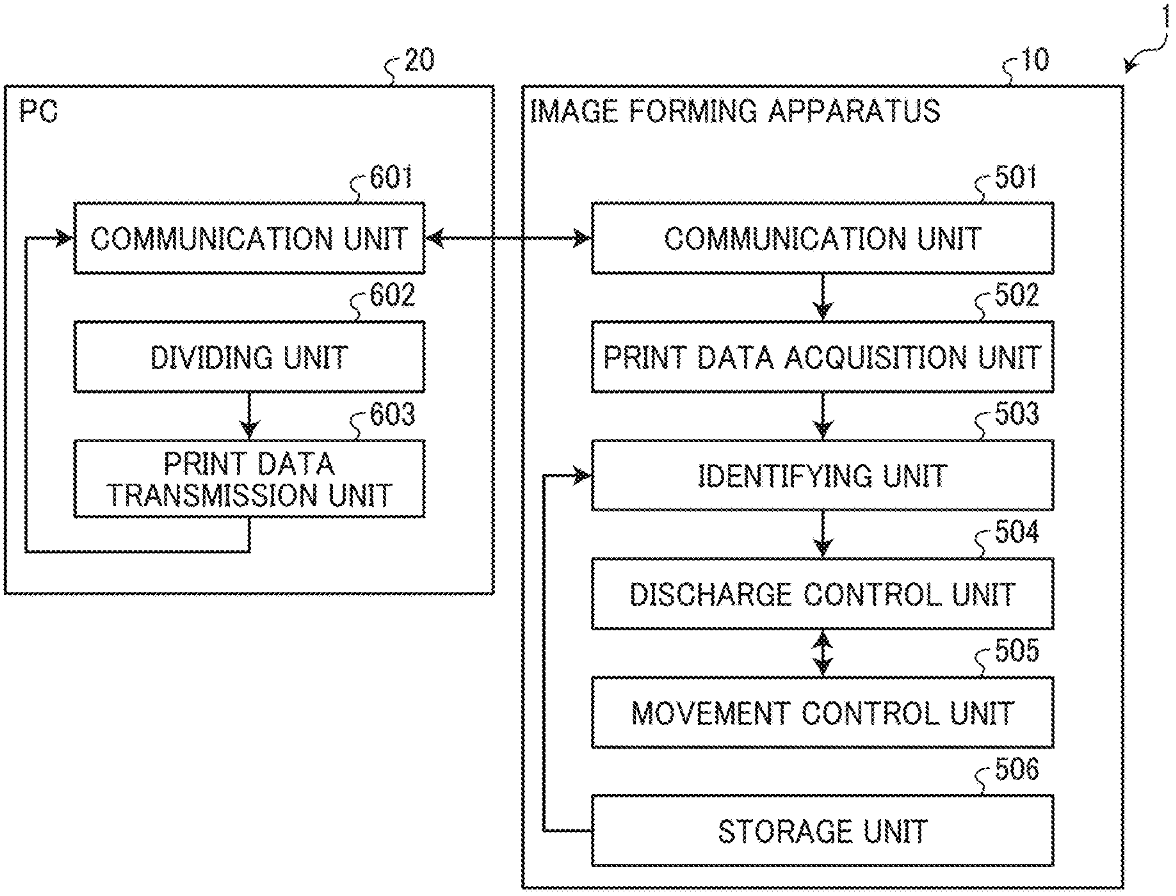
FIG. 4 is a block diagram illustrating a functional configuration of the image forming system, according to an embodiment of the present disclosure.
Figure 5A:
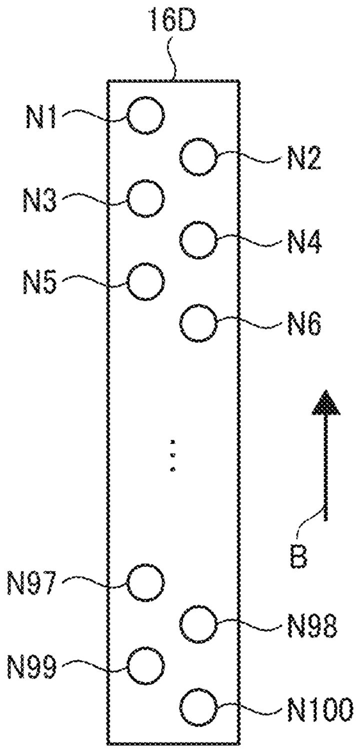
FIGS. 5A and 5B are diagrams each illustrating an operation of the image forming apparatus illustrated in FIG. 1, in a case where the landing positions of ink do not deviate in a sub-scanning direction of liquid discharge heads.
Figure 5B:
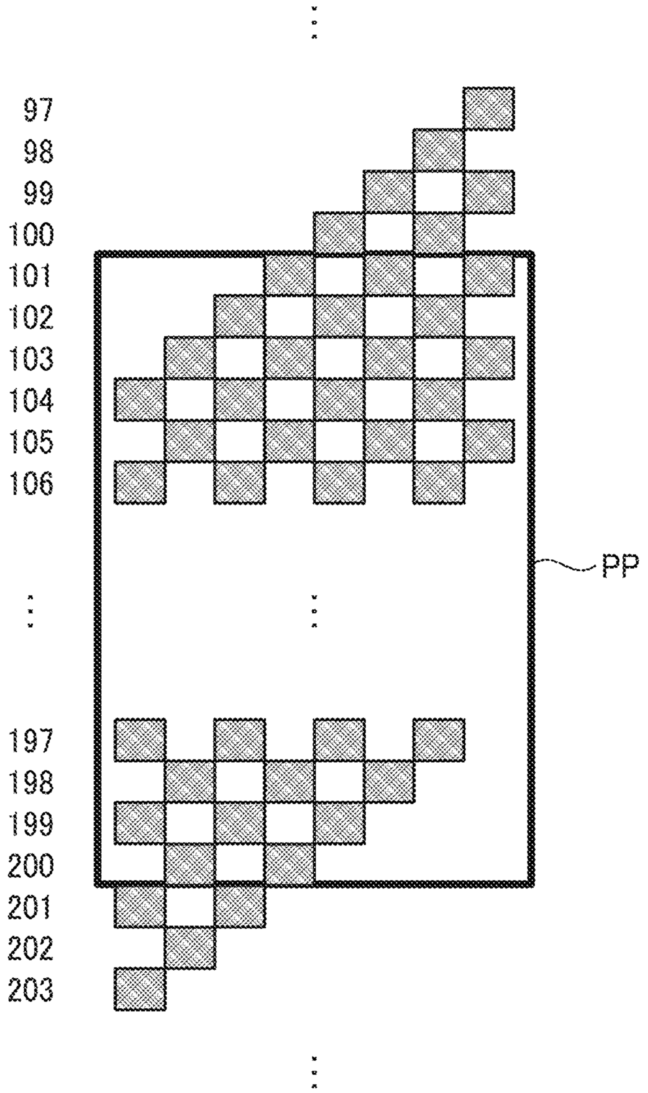
Figure 6A:
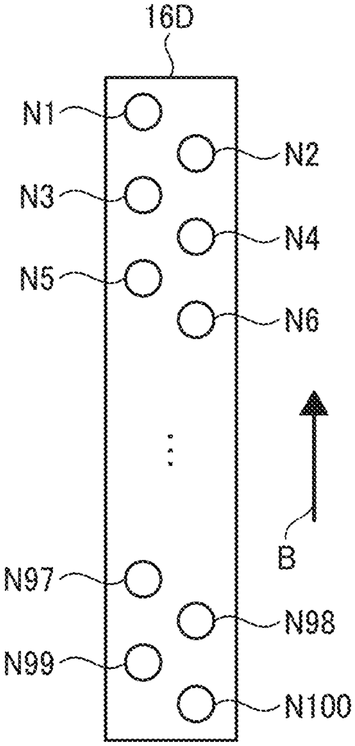
FIGS. 6A and 6B are diagrams each illustrating an operation of the image forming apparatus illustrated in FIG. 1, in a case where the landing positions of ink deviate in the sub-scanning direction of the liquid discharge heads.
Figure 6B:
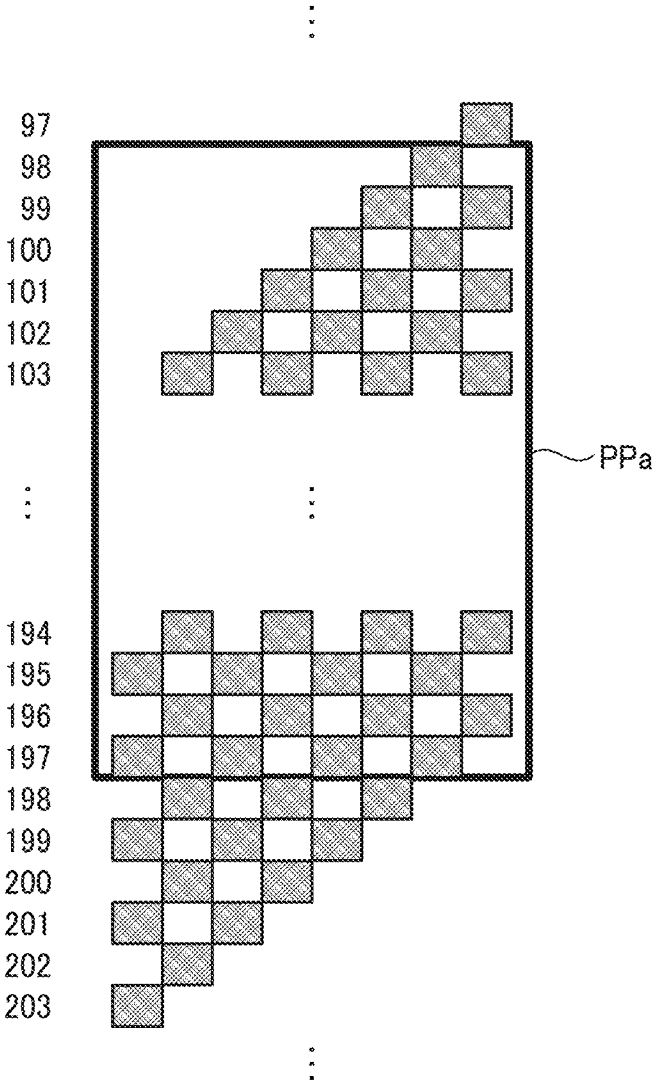

FIG. 4 is a block diagram illustrating a functional configuration of the image forming system according to the present embodiment. FIGS. 5A and 5B are diagrams each illustrating an operation of the image forming apparatus in a case where the landing positions of ink do not deviate in the sub-scanning direction of the liquid discharge heads. FIGS. 6A and 6B are diagrams each illustrating an operation of the image forming apparatus in a case where the landing positions of ink deviate in the sub-scanning direction of the liquid discharge heads. A description is given of the functional configuration and an operation of the image forming system 1 according to the present embodiment with reference to FIGS. 4 to 6B.

As illustrated in FIG. 4, the PC 20 includes a communication unit 601, a dividing unit 602, and a print data transmission unit 603.

The communication unit 601 is a functional unit for performing data communication with the image forming apparatus 10. The communication unit 601 is implemented by the network interface 209 illustrated in FIG. 3.

The dividing unit 602 is a functional unit that divides the print data to be subjected to printing, into a plurality of divided print data. The dividing unit 602 divides the print data into divided print data to be allocated to the nozzle array of the liquid discharge head 16U of the carriage 15U and the nozzle array of the liquid discharge head 16D of the carriage 15D.

Descriptions are given of a nozzle configuration of the liquid discharge head 16D and the divided print data to be allocated to the liquid discharge head 16D with reference to FIGS. 5A and 5B. The liquid discharge head 16D herein is the representative of the liquid discharge heads 16D and 16U. The liquid discharge head 16D includes, for example, 100 nozzles such as nozzles N1 to N100 illustrated in FIG. 5A. In FIGS. 5A and 5B, the direction from bottom to top is the sub-scanning direction (indicated by arrow B). As illustrated in FIG. 5A, the nozzles N1 to N100 are arranged in the sub-scanning direction. Although the nozzles N1 to N100 are arranged in a zigzag shape in the sub-scanning direction in FIG. 5A, the nozzle arrangement is not limited thereto. For example, the nozzles N1 to N100 may be linearly arranged in the sub-scanning direction.

FIG. 5B illustrates a part of a pixel configuration of the print data. In FIG. 5B, numbers are assigned to the pixel rows each extending in the main scanning direction (lateral direction in FIG. 5B) in the print data for convenience of description. In FIG. 5B, a print data portion PP is a part of the print data corresponding to 100 pixel rows (e.g., pixel rows 101 to 200). Using the print data portion PP, the liquid discharge head 16D discharges ink in a discharge operation in certain scanning in the main scanning direction performed by the carriage 15D. In other words, the liquid discharge head 16D discharges ink from the nozzles N1, N2, . . . and N100 based on data portions corresponding to the pixel rows 101, 102, . . . and 200, respectively. In the subsequent scanning by the carriage 15D, the liquid discharge head 16D discharges ink from the nozzles N1, N2, . . . , and N100 based on data portions corresponding to the pixel rows 201, 202, . . . , and 300, respectively. The liquid discharge head 16D repeats such an operation until an image is formed for the entire print data. The liquid discharge head 16U disposed upstream from the liquid discharge head 16D in the sub-scanning direction operates in a manner similar to that of the liquid discharge head 16D described above.

The pixel configuration of the print data according to the present embodiment is not limited to that illustrated in FIG. 5B, and another pixel configuration may be used. In addition, the number of nozzles is not limited to 100 as illustrated in FIG. 5A.

With the operation described above, when the landing positions of ink discharged by the liquid discharge head 16D of the carriage 15D overlap, without deviations, with the landing positions of the ink discharged by the liquid discharge head 16U of the carriage 15U (disposed upstream from the carriage 15D in the sub-scanning direction) in the sub-scanning direction, a desired clear image is printed on the recording medium P. In other words, ideally, the divided print data can be obtained by dividing, with the dividing unit 602, the print data into data portions each corresponding to 100 pixel rows, like the print data portion PP illustrated in FIG. 5B. The print data portion PP is ideal divided print data for a case where the installation positions of the carriages 15U and 15D in the sub-scanning direction are not deviated from the target installation positions. However, in an image forming apparatus including a plurality of carriages (e.g., the carriages 15U and 15D) like the image forming apparatus 10 according to the present embodiment, if the carriages are not accurately positioned at the respective designed positions, the dot formation positions are misaligned among the carriages. As a result, an image printed by these carriages is not clear. Assume that the carriage 15D is installed at a position deviated downstream in the sub-scanning direction from the target installation position by three nozzles of the liquid discharge head 16D. In such a case, when the liquid discharge head 16D discharges ink based on the data portion of the print data corresponding to the pixel rows 101 to 200 as illustrated in FIG. 5B, an image printed on the recording medium P is deviated downstream by three pixels. In this case, the image printed by the liquid discharge head 16D overlaps the image printed by the liquid discharge head 16U at a position deviated by three pixels, and the printed image is not clear.

To address such an inconvenience, in the present embodiment, the amount of deviation in installation position of the carriage 15D in the sub-scanning direction from the target installation position is grasped in advance, and the liquid discharge head 16D is controlled to discharge ink based on the divided print data in which the amount of deviation is taken into account. For example, assume that the installation position of the carriage 15D carrying the liquid discharge head 16D illustrated in FIG. 6A is deviated downstream in the sub-scanning direction by three nozzles of the liquid discharge head 16D as described above. In this case, the liquid discharge head 16D discharges ink based on a print data portion PPa (serving as a shifted data portion) illustrated in FIG. 6B, which is shifted downstream in the sub-scanning direction by three pixels, from the print data portion PP (i.e., ideal divided print data) illustrated in FIG. 5B. In other words, the liquid discharge head 16D discharges ink from the nozzles N1, N2, . . . , and N100 based on data portions corresponding to the pixel rows 98, 99, . . . , and 197, respectively. In the subsequent scanning of the carriage 15D, the liquid discharge head 16D discharges ink from the nozzles N1, N2, . . . , and N100 based on data portions corresponding to the pixel rows 198, 199, . . . , and 297, respectively. The liquid discharge head 16D repeats such an operation until an image is formed for the entire print data.

In this way, the liquid discharge head 16D discharges ink based on the shifted data portion that is shifted by the number of pixels in the print data corresponding to the amount of deviation in installation position of the carriage 15D in the sub-scanning direction. As a result, the landing positions of ink discharged by the liquid discharge head 16D of the carriage 15D match the landing positions of ink discharged by the liquid discharge head 16U of the carriage 15U in the sub-scanning direction, so as to print a desired clear image on the recording medium P.

However, when the dividing unit 602 divides the print data and allocates the print data portion PP illustrated in FIG. 5B (corresponding to the pixel rows 101 to 200 and serving as the divided print data) to the ink discharge of the liquid discharge head 16D as described above, the print data portion PP does not include the data portion corresponding to the pixel rows 98 to 100. In this case, the ink discharge based on the print data portion PPa illustrated in FIG. 6B cannot be performed. To address such an inconvenience, in the present embodiment, the dividing unit 602 of the PC 20 divides the print data into data portions (divided print data) having margins at both ends in the direction corresponding to the sub-scanning direction so that the identifying unit 503 of the image forming apparatus 10 can identify, from the divided print data, a shifted data portion shifted by the number of pixels corresponding to the amount of deviation in installation position of the carriage 15D in the sub-scanning direction, as the data portion used for ink discharge. In other words, the dividing unit 602 divides the print data into not the data portions (divided print data) corresponding to the length of the nozzle array of the liquid discharge head 16D (in FIG. 5, the length of the nozzle array corresponds to 100 pixel rows) but data portions (divided print data) having a size extended by a set number of pixels at each end in the direction corresponding to the sub-scanning direction. For example, assume that the maximum amount of deviation in installation position of the carriage 15D in the sub-scanning direction is equivalent to five nozzles (five pixels). In this case, in the example illustrated in FIGS. 5A to 6B, the dividing unit 602 divides the print data not into the data portions each corresponding to 100 pixels, such as the data portion corresponding to the pixel rows 101 to 200 and the data portion corresponding to the pixel rows 201 to 300, but into data portions each having a size extended by five pixels at both ends in the direction corresponding to the sub-scanning direction, such as a data portion corresponding to the pixel rows 96 to 205 and a data portion (divided print data) corresponding to the pixel rows 196 to 305. Further assume that the carriage 15D is installed at a position deviated downstream in the sub-scanning direction from the designed position by three nozzles of the liquid discharge head 16D, as described above. In this case, when the image forming apparatus 10 receives the data portion corresponding to the pixel rows 96 to 205 as one of the divided print data, the image forming apparatus 10 can identify a data portion corresponding to the pixel row 98 to 197 from the divided print data and allocate the identified data portion to the liquid discharge head 16D.

The deviation in installation position of the carriage 15D in the sub-scanning direction may be considered as a deviation from a reference position, or a deviation relative to the installation position of the carriage 15U. The processing of dividing print data performed by the dividing unit 602 for coping with the deviation in installation position of the carriage 15D in the sub-scanning direction and the processing of identifying the data portion of the divided print data to be allocated to the liquid discharge head 16D can be applied to the carriage 15U and the liquid discharge head 16U.

Returning back to FIG. 4, the description is continued below.

The print data transmission unit 603 is a functional unit that transmits the divided print data divided by the dividing unit 602 to the image forming apparatus 10 via the communication unit 601.

The dividing unit 602 and the print data transmission unit 603 described above are implemented, for example, as the CPU 201 illustrated in FIG. 3 executes a program. Note that some or all of the functional units described above may be implemented by a hardware circuit (e.g., an integrated circuit) such as a field-programmable gate array (FPGA) or an ASIC, in place of software programs.

Each functional unit of the PC 20 illustrated in FIG. 4 is a conceptual representation of a function, and the functional configuration of the PC 20 is not limited to that illustrated in FIG. 4. For example, a plurality of functional units of the PC 20 illustrated as independent units in FIG. 4 may be configured as a single functional unit. Further, functions provided by a single functional unit of the PC 20 illustrated in FIG. 4 may be divided and allocated to a plurality of functional units.

As illustrated in FIG. 4, the image forming apparatus 10 includes a communication unit 501, a print data acquisition unit (acquisition unit) 502, an identifying unit 503, a discharge control unit 504, a movement control unit 505, and a storage unit 506.

The communication unit 501 is a functional unit that performs data communication with the PC 20. The communication unit 501 is implemented by the communication interface 109 illustrated in FIG. 2.

The storage unit 506 is a functional unit that stores in advance information indicating deviations in installation positions of the carriage 15U and the carriage 15D in the sub-scanning direction described above. The amount of deviation in installation positions of the carriage 15U and the carriage 15D in the sub-scanning direction may be obtained by, for example, printing a chart for checking deviations in advance and checking the deviation on the chart. Alternatively, the image forming apparatus 10 may include a scanner that reads the printed chart, and the amount of deviation may be automatically obtained based on read data obtained by the scanner. The information indicating the obtained amounts of deviation in installation positions of the carriage 15D and the carriage 15U in the sub-scanning direction is stored in the storage unit 506. For obtaining the deviation in installation position of the carriage 15D in the sub-scanning direction relative to the installation position of the carriage 15U in the sub-scanning direction, only information indicating the deviation of the carriage 15D may be stored in the storage unit 506. For obtaining the deviation in installation position of the carriage 15U in the sub-scanning direction relative to the installation position of the carriage 15D in the sub-scanning direction, only information indicating the deviation of the carriage 15U may be stored in the storage unit 506. The storage unit 506 is implemented by the RAM 103 or the NVRAM 104 illustrated in FIG. 2.

The print data acquisition unit 502 is a functional unit that acquires the divided print data from the PC 20 via the communication unit 501.

The identifying unit 503 is a functional unit that reads, from the storage unit 506, the information indicating the deviations in installation positions of the carriage 15U and the carriage 15D in the sub-scanning direction, and identifies, from each divided print data acquired by the print data acquisition unit 502, a shifted data portion shifted by the number of pixels corresponding to the deviation indicated by the information. With this function, the data portion used for ink discharge by the liquid discharge head 16U of the carriage 15U and the data portion used for ink discharge by the liquid discharge head 16D of the carriage 15D are obtained.

The discharge control unit 504 is a functional unit that controls the ink discharge by the liquid discharge head 16U using the data portion corresponding to the liquid discharge head 16U, identified by the identifying unit 503, and controls the ink discharge by the liquid discharge head 16D using the data portion corresponding to the liquid discharge head 16D, identified by the identifying unit 503. Specifically, the discharge control unit 504 controls the ink discharge by the liquid discharge head 16U via the print controller 106U (control circuit) and controls the ink discharge by the liquid discharge head 16D via the print controller 106D (control circuit).

The movement control unit 505 is a functional unit that controls the carriage 15U and the carriage 15D to move in the main scanning direction in accordance with the control of the ink discharge by the liquid discharge head 16U and the liquid discharge head 16D by the discharge control unit 504. The movement control unit 505 controls the carriage 15U and the carriage 15D to move in the main scanning direction based on the data portions identified by the identifying unit 503. Specifically, the movement control unit 505 controls the carriage 15U to move in the main scanning direction via the main scanning motor driver 107U and controls the carriage 15D to move in the main scanning direction via the main scanning motor driver 107D.

The print data acquisition unit 502, the identifying unit 503, the discharge control unit 504, and the movement control unit 505 described above are implemented, for example, as the CPU 101 illustrated in FIG. 2 executes a program. Some or all of the functional units described above may be implemented by a hardware circuit (e.g., an integrated circuit) such as a FPGA or an ASIC, in place of software programs.

Each functional unit of the image forming apparatus 10 illustrated in FIG. 4 is a conceptual representation of a function, and the functional configuration of the image forming apparatus 10 is not limited to that illustrated in FIG. 4. For example, a plurality of functional units of the image forming apparatus 10 illustrated as independent units in FIG. 4 may be configured as a single functional unit. Further, functions provided by a single functional unit of the image forming apparatus 10 illustrated in FIG. 4 may be divided and allocated to a plurality of functional units.

Some of the functional units of the image forming apparatus 10 may be implemented by the PC 20, or some of the functional units of the PC 20 may be implemented by the image forming apparatus 10.

For example, the processing of dividing print data performed by the dividing unit 602 of the PC 20 may be performed by the image forming apparatus 10. Further, for example, the processing of identifying the data portion of the divided print data performed by the identifying unit 503 of the image forming apparatus 10 may be performed by the PC 20.

Overall Operation by Image Forming System

Figure 7:
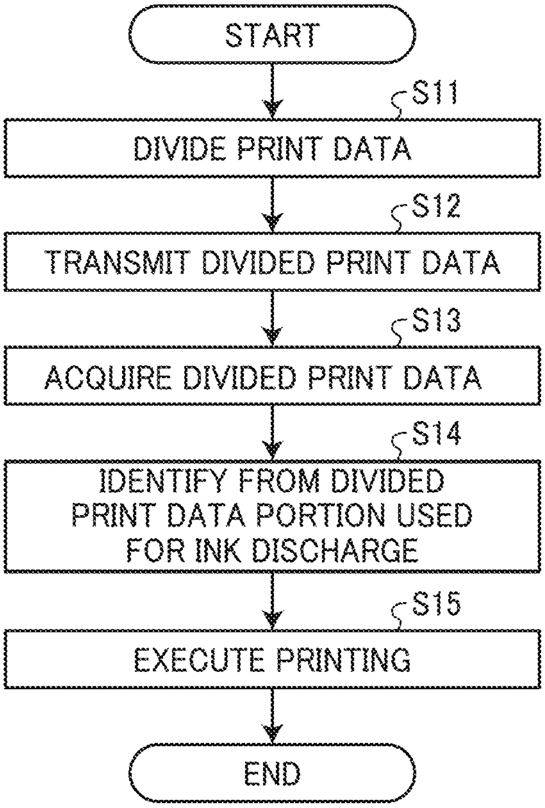
FIG. 7 is a flowchart of an overall operation of the image forming system, according to an embodiment of the present disclosure.

FIG. 7 is a flowchart of an overall operation of the image forming system according to the present embodiment. A description is given of the overall operation executed by the image forming system 1 according to the present embodiment with reference to FIG. 7.

Step S11

The dividing unit 602 of the PC 20 divides the print data into divided print data to be allocated to the nozzle array of the liquid discharge head 16U of the carriage 15U and the nozzle array of the liquid discharge head 16D of the carriage 15D. At this time, the dividing unit 602 divides the print data into divided print data each having margins at both ends in the direction corresponding to the sub-scanning direction so that the image forming apparatus 10 can identify, from the divided print data, the shifted data portions shifted by the number of pixels corresponding to the amounts of deviation in installation positions of the carriage 15U and the carriage 15D in the sub-scanning direction, respectively. The shifted data portions thus identified are used for ink discharge. In other words, the dividing unit 602 divides the print data into the divided data portions (serving as the divided print data) each having the size extended from the size corresponding to the length of the nozzle array of the liquid discharge head 16D and the liquid discharge head 16U. The extended data size is extended by the set number of pixels at each end in the direction corresponding to the sub-scanning direction. Then, the process proceeds to step S12.

Step S12

The print data transmission unit 603 of the PC 20 transmits the divided print data divided by the dividing unit 602 to the image forming apparatus 10 via the communication unit 601. Then, the process proceeds to step S13.

Step S13

The print data acquisition unit 502 of the image forming apparatus 10 acquires the divided print data from the PC 20 via the communication unit 501. Then, the process proceeds to step S14.

Step S14

The identifying unit 503 of the image forming apparatus 10 reads, from the storage unit 506, the information indicating the deviation in installation positions of the carriage 15U and the carriage 15D in the sub-scanning direction. The identifying unit 503 then identifies, in each divided print data acquired by the print data acquisition unit 502, the shifted data portions shifted by the number of pixels corresponding to the amount of deviation indicated by the information, as the data portions to be subjected to printing, used for discharging ink by the liquid discharge head 16U and the liquid discharge head 16D, respectively. With this operation, the data portion used for ink discharge by the liquid discharge head 16U of the carriage 15U and the data portion used for ink discharge by the liquid discharge head 16D of the carriage 15D are obtained. Then, the process proceeds to step S15.

Step S15

The discharge control unit 504 of the image forming apparatus 10 controls the liquid discharge head 16U to discharge ink using the data portion corresponding to the liquid discharge head 16U, identified by the identifying unit 503, and controls the liquid discharge head 16D to discharge ink using the data portion corresponding to the liquid discharge head 16D, identified by the identifying unit 503. Thus, printing on the recording medium P is executed. At this time, the movement control unit 505 of the image forming apparatus 10 controls the carriage 15U and the carriage 15D to move in the main scanning direction in accordance with the control of the ink discharge from the liquid discharge head 16U and the liquid discharge head 16D by the discharge control unit 504.

After the division of the print data in step S11, steps S12 to S15 are repeated until the printing of the entire print data is completed.

As described above, the image forming apparatus 10 according to the present embodiment is a serial image forming apparatus that includes a plurality of carriages each carrying one or more liquid discharge heads. The print data acquisition unit 502 acquires divided print data divided from the print data. Each divided print data is extended in the direction corresponding to the conveyance direction of the recording medium P from a data portion of the print data corresponding to the length of the nozzle array (arranged in the conveyance direction of the recording medium P) of the liquid discharge head 16D (or 16U). The identifying unit 503 identifies, from the divided print data acquired by the print data acquisition unit 502, the shifted data portion shifted by the number of pixels corresponding to the amount of deviation in installation position of the carriage 15D (or 15U) in the conveyance direction, from the target installation position, as the data portion to be used for ink discharge by the liquid discharge head 16D (or 16U). The shifted data portion has the length corresponding to the length of the nozzle array. The discharge control unit 504 controls the liquid discharge head 16D (or 16U) to discharge ink to the recording medium P using the data portion identified by the identifying unit 503. The movement control unit 505 controls the carriage 15D (or 15U) to move in the main scanning direction based on the data portion identified by the identifying unit 503. More specifically, the divided print data acquired by the print data acquisition unit 502 is divided from the print data such that each divided print data is extended at each end in the direction corresponding to the conveyance direction of the recording medium P by the set number of pixels from the data portion of the print data corresponding to the length of the nozzle array. As a result, deviations in landing positions of ink caused by variations in installation positions of the carriages (for example, the carriages 15U and 15D) arranged in the sub-scanning direction (conveyance direction) can be eliminated.

Note that, in a case where at least a portion of the functional units of the image forming apparatus 10 and the PC 20 according to the above-described embodiments is implemented by execution of a computer program, the computer program is prestored in, for example, a ROM. Alternatively, computer programs executed by the image forming apparatus 10 and the PC 20 according to the above-described embodiments may be provided as a file in a format installable to or executable by a computer and stored in a computer-readable recording medium, such as a compact disc read only memory (CD-ROM), a flexible disk (FD), a compact disc recordable (CD-R), or a digital versatile disk (DVD). Alternatively, the computer programs executed by the image forming apparatus 10 and the PC according to the above-described embodiments may be stored in a computer connected to a network, such as the Internet, and may be downloaded through the network. Alternatively, the computer programs executed by the image forming apparatus 10 and the PC 20 according to the above-described embodiments may be provided or distributed via a network such as the Internet. The computer programs to be executed by the image forming apparatus 10 and the PC 20 according to the above-described embodiments have module structure including at least one of the above-described functional units. Regarding the actual hardware related to the computer programs, the CPU reads and executes the computer programs from the above-mentioned storage device to load the computer programs onto the main memory to implement the above-described functional units.

The present disclosure includes the following aspects.

According to Aspect 1, a serial image forming apparatus including a plurality of carriages each of which carries one or more liquid discharge heads includes an acquisition unit, an identifying unit, a discharge control unit, and a movement control unit. The liquid discharge head includes a nozzle array arranged in a conveyance direction of a recording medium, and the nozzle array has a length in the conveyance direction.

The acquisition unit acquires divided print data divided from print data such that the divided print data has an extended size extended in a direction corresponding to the conveyance direction of the recording medium from a size corresponding to the length of the nozzle array.

The identifying unit identifies, for the liquid discharge head of a particular carriage of the plurality of carriages, a shifted data portion having a size corresponding to the length of the nozzle array, from the divided print data acquired by the acquisition unit. The shifted data portion is shifted by a number of pixels corresponding to an amount of deviation from a target installation position of the particular carriage in the conveyance direction, as a data portion to be used for ink discharge by the liquid discharge head.

The discharge control unit controls the liquid discharge head to discharge ink to the recording medium using the shifted data portion identified by the identifying unit.

The movement control unit controls the particular carriage to move in a main scanning direction based on the shifted data portion identified by the identifying unit.

According to Aspect 2, in the image forming apparatus of Aspect 1, the divided print data acquired by the acquisition unit is extended by a set number of pixels at each end in the direction corresponding to the conveyance direction, from the data portion of the print data corresponding to the length of the nozzle array.

According to Aspect 3, the image forming apparatus of Aspect 1 or 2 further includes a storage unit that stores information indicating the amount of deviation in installation position of the particular carriage in the conveyance direction, from the target installation position.

The identifying unit reads the information indicating the amount of deviation from the storage unit, and identifies, from the divided print data, the shifted data portion having the size corresponding to the length of the nozzle array, shifted by the number of pixels corresponding to the amount of deviation indicated by the information. The shifted data portion is to be subjected to printing.

According to Aspect 4, in the image forming apparatus of any one of Aspects 1 to 3, the plurality of carriages includes a carriage carrying the liquid discharge head to discharge an achromatic ink, and a carriage carrying the liquid discharge head to discharge a chromatic ink.

According to Aspect 5, an image forming system including a serial image forming apparatus that includes a plurality of carriages each of which carries one or more liquid discharge heads includes a dividing unit, an acquisition unit, an identifying unit, a discharge control unit, and a movement control unit. The liquid discharge head includes a nozzle array arranged in a conveyance direction of a recording medium, and the nozzle array has a length in the conveyance direction.

The dividing unit divides, from print data, divided print data having an extended size extended in a direction corresponding to the conveyance direction from a size corresponding to the length of the nozzle array.

The acquisition unit acquires the divided print data divided by the dividing unit.

The identifying unit identifies, for the liquid discharge head of a particular carriage of the plurality of carriages, a shifted data portion having a size corresponding to the length of the nozzle array, from the divided print data acquired by the acquisition unit. The shifted data portion is shifted by a number of pixels corresponding to an amount of deviation from a target installation position of the particular carriage in the conveyance direction, as a data portion to be used for ink discharge by the liquid discharge head.

The discharge control unit controls the liquid discharge head to discharge ink to the recording medium using the shifted data portion identified by the identifying unit.

The movement control unit controls the particular carriage to move in a main scanning direction based on the shifted data portion identified by the identifying unit.

According to Aspect 6, the image forming system of Aspect 5 further includes an information processing apparatus including the dividing unit, and the image forming apparatus includes the acquisition unit, the identifying unit, the discharge control unit, and the movement control unit.

Aspect 7 concerns a method for forming an image by a serial image forming apparatus including a plurality of carriages each of which carries one or more liquid discharge heads. The method includes acquiring divided print data divided from print data such that the divided print data is extended in a direction corresponding to a conveyance direction of a recording medium from a data portion of the print data corresponding to a length in the conveyance direction of a nozzle array of the liquid discharge head. The nozzle array is arranged in the conveyance direction.

The method further includes identifying, from the acquired divided print data, a shifted data portion having the data size corresponding to the length of the nozzle array. The shifted data portion is shifted by the number of pixels corresponding to the amount of deviation from a target installation position of a particular carriage of the plurality of carriages in the conveyance direction, as a data portion to be used for ink discharge by the liquid discharge head.

The method further includes controlling the liquid discharge head to discharge ink to the recording medium using the shifted data portion identified by the identifying unit, and controlling the particular carriage to move in the main scanning direction based on the shifted data portion identified by the identifying unit.

Aspect 8 concerns a computer program for causing a computer that controls a serial image forming apparatus including a plurality of carriages plurality of carriages each of which carries one or more liquid discharge heads to perform a method that includes acquiring divided print data divided from print data such that the divided print data is extended in a direction corresponding to a conveyance direction of a recording medium from a data portion of the print data corresponding to a length in the conveyance direction of a nozzle array of the liquid discharge head. The nozzle array is arranged in the conveyance direction.

The method further includes identifying, from the acquired divided print data, a shifted data portion having the data size corresponding to the length of the nozzle array. The shifted data portion is shifted by the number of pixels corresponding to the amount of deviation from a target installation position of a particular carriage of the plurality of carriages in the conveyance direction, as a data portion to be used for ink discharge by the liquid discharge head.

The method further includes controlling the liquid discharge head to discharge ink to the recording medium using the shifted data portion identified by the identifying unit, and controlling the particular carriage to move in the main scanning direction based on the shifted data portion identified by the identifying unit.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image forming apparatus comprising:

a plurality of carriages each of which carries a liquid discharge head; and circuitry configured to:

acquire divided print data divided from print data, the divided print data having an extended size extended in a direction corresponding to a conveyance direction of a recording medium from a size corresponding to a length of a nozzle array of the liquid discharge head in the conveyance direction;

identify, for the liquid discharge head of a particular carriage of the plurality of carriages, a shifted data portion from the divided print data, the shifted data portion having a size corresponding to the length of the nozzle array and being shifted by a number of pixels corresponding to an amount of deviation from a target installation position of the particular carriage in the conveyance direction;

control the liquid discharge head to discharge ink to the recording medium using the shifted data portion; and control the particular carriage to move in a main scanning direction based on the shifted data portion.

2. The image forming apparatus according to claim 1, wherein the divided print data is extended by a set number of pixels at each end in the direction corresponding to the conveyance direction, from the size corresponding to the length of the nozzle array.

3. The image forming apparatus according to claim 1, further comprising a memory that stores information indicating the amount of deviation in installation position of the particular carriage, wherein the circuitry is configured to:

read the information indicating the amount of deviation from the memory; and identify, from the divided print data, the shifted data portion shifted by the number of pixels corresponding to the amount of deviation indicated by the information.

4. The image forming apparatus according to claim 1, wherein the liquid discharge head carried by one carriage of the plurality of carriages is to discharge an achromatic ink, and the liquid discharge head carried by another carriage of the plurality of carriages is to discharge a chromatic ink.

5. An image forming system comprising:

the image forming apparatus according to claim 1; and another circuitry configured to divide, from the print data, the divided print data.

6. The image forming system according to claim 5, further comprising an information processing apparatus including the another circuitry.

7. A method for forming an image by an image forming apparatus including a plurality of carriages each of which carries a liquid discharge head, the method comprising:

acquiring divided print data divided from print data, the divided print data having an extended size extended in a direction corresponding to a conveyance direction of a recording medium from a size corresponding to a length of a nozzle array of the liquid discharge head in the conveyance direction;

identifying, for the liquid discharge head of a particular carriage of the plurality of carriages, a shifted data portion from the divided print data, the shifted data portion having a size corresponding to the length of the nozzle array and being shifted by a number of pixels corresponding to an amount of deviation from a target installation position of the particular carriage in the conveyance direction;

controlling the liquid discharge head to discharge ink to the recording medium using the shifted data portion; and controlling the particular carriage to move in a main scanning direction based on the shifted data portion, the main scanning direction being perpendicular to the conveyance direction.

8. A non-transitory recording medium storing a plurality of program codes which, when executed by one or more processors, causes the one or more processors to perform a method for forming an image by an image forming apparatus including a plurality of carriages each of which carries a liquid discharge head, the method comprising:

acquiring divided print data divided from print data, the divided print data having an extended size extended in a direction corresponding to a conveyance direction of a recording medium from a size corresponding to a length of a nozzle array of the liquid discharge head in the conveyance direction;

identifying, for the liquid discharge head of a particular carriage of the plurality of carriages, a shifted data portion from the divided print data, the shifted data portion having a size corresponding to the length of the nozzle array and being shifted by a number of pixels corresponding to an amount of deviation from a target installation position of the particular carriage in the conveyance direction;

controlling the liquid discharge head to discharge ink to the recording medium using the shifted data portion; and controlling the particular carriage to move in a main scanning direction based on the shifted data portion, the main scanning direction being perpendicular to the conveyance direction.

* * * * *